United States Patent [19]

Bradley et al.

[11] 4,310,390
[45] Jan. 12, 1982

[54] PROTECTIVE COATING PROCESS FOR ALUMINUM AND ALUMINUM ALLOYS

[75] Inventors: Robert E. Bradley, Temple, Ga.; William R. Keithler, Florissant, Mo.

[73] Assignee: Lockheed Corporation, Burbank, Calif.

[21] Appl. No.: 163,821

[22] Filed: Jun. 27, 1980

Related U.S. Application Data

[63] Continuation of Ser. No. 7,468, Jan. 26, 1979, abandoned, which is a continuation of Ser. No. 823,331, Aug. 10, 1977, abandoned.

[51] Int. Cl.$^3$ ............................................... C25D 11/24
[52] U.S. Cl. ............................... 204/37 R; 204/35 N; 204/38 A; 204/38 E; 427/409; 427/419.5
[58] Field of Search ............... 204/35 N, 37 R, 38 A, 204/38 E; 427/388, 409, 388.2, 388.4, 419.5; 148/6.27

[56] References Cited

U.S. PATENT DOCUMENTS

| | | | |
|---|---|---|---|
| 2,902,390 | 9/1959 | Bell | 427/388 |
| 3,026,255 | 3/1962 | Riou et al. | 204/33 |
| 3,053,691 | 9/1962 | Hartman et al. | 427/388 |
| 3,491,011 | 1/1970 | Le Bras | 204/181 R |
| 3,505,128 | 4/1970 | Fujii | 148/6.2 |
| 3,533,920 | 10/1970 | Covino | 204/38 A |
| 3,672,966 | 6/1972 | Geisler | 204/35 N |
| 3,711,313 | 1/1973 | Nagano | 204/38 A |
| 3,775,266 | 11/1973 | Ikeda et al. | 204/38 E |
| 3,874,949 | 4/1975 | Kaneda et al. | 148/6.27 |
| 3,961,111 | 6/1976 | Smith | 427/419 |

FOREIGN PATENT DOCUMENTS

| | | |
|---|---|---|
| 1150812 | 5/1969 | United Kingdom . |
| 1169690 | 11/1969 | United Kingdom . |
| 1453071 | 10/1976 | United Kingdom . |
| 1474135 | 5/1977 | United Kingdom . |
| 2008979 | 6/1979 | United Kingdom . |

*Primary Examiner*—Andrew Metz
*Assistant Examiner*—William Leader
*Attorney, Agent, or Firm*—John J. Sullivan

[57] ABSTRACT

A process is described for sealing anodic coatings on aluminum and the alloys of aluminum while simultaneously impregnating the anodic coating with organic resin during the sealing operation, thereby providing a protective coating to the anodized aluminum which, among other things has superior corrosion resistant characteristics.

A specified water-borne resin coating material possessing excellent stability at temperatures in excess of 200° F. is used to convert the unsealed anodic coating to the monohydrate/trihydrate form of aluminum oxide during the sealing step of an otherwise conventional aluminum anodizing process. Subsequently, the sealed anodic film is cured at temperatures up to 500° F. This process provides a total protection system having characteristics superior to separately sealed and organically primed aluminum obtained through conventional processing.

7 Claims, No Drawings

PROTECTIVE COATING PROCESS FOR ALUMINUM AND ALUMINUM ALLOYS

This application is a continuation, of application Ser. No. 7,468, filed Jan. 26, 1979, now abandoned, which is a continuation of application Ser. No. 823,331, filed Aug. 10, 1977, now abandoned.

This invention relates generally to processes for providing protective coatings to metals and more particularly to such a process whereby a superior coating than heretofore possible, notably with respect to protection against corrosion, is applied to aluminum and aluminum alloys and an ultimate product of great longevity is thereby produced.

Current methods of applying protective coatings, for example so called "corrosion-proof" coatings or primers, on aluminum substrates rely on the application of a primer subsequent to the chemical surface treatment process. Thus, multiple separate and distinct processes are required whereby an aluminum substrate or workpiece is first anodized, then sealed and finally the primer is applied. In other words, a build-up of layers results in the ultimate coating with the chemical/mechanical bonding of the layers being critical to the durability of the protective coating and therefore to the service life of the aluminum product. This entire operation in producing the layered coating involves appreciable time and labor.

The present invention is directed to improvements in this art and to that end proposes a new process whereby the required sealing and primer applying actions are simultaneous and a novel material formulation to accomplish such simultaneous actions. Thus, the process herein proposed permits a substantial reduction in time and labor for the complete operation while at the same time producing a superior coating than heretofore possible, effected by an integral bond of the coating and the oxide film. This is believed to be due to the introduction of the soluble resin into the pores of the oxide film during the sealing operation. Subsequently, the thermosetting resin is cross-linked during the curing operation providing a durable and protective coating.

More precisely, the material herein proposed simultaneously seals the anodic coating to its monohydrate/trihydrate form and impregnates it with a water-borne organic resin. The water-borne organic resin material, when applied to an unsealed anodic coating under controlled time/temperature conditions, provides a resin impregnated, sealed anodic coating capable of withstanding severe corrosion environments. Such environments are exemplified by coastal regions subject to heavy moisture and often salt-laden atmosphere such as that encountered in the aviation, marine, architectural and auto industries.

The preferred resin coating material of this invention is a polymer comprised of a water soluble acrylic resin, which in turn may be comprised of various acrylic containing materials such as acrylonitrile, methacrylonitrile, acrylamide, methacrylamide, methacrylic acid, acrylic acid, methacrylic esters and acrylic esters. Most preferably, the resin coating material is comprised of polymerized or copolymerized monomers selected from the following formula:

$$CH_2=CH(A)-C(O)-O-R$$

wherein A may be hydrogen, methyl or ethyl; and the R may be hydrogen, alkyl of from 1 to 20 carbon atoms, preferably two to 3 carbon atoms, hydroxy substituted alkyl of from 1 to 20 carbon atoms preferably 2 to 8 carbon atoms, and even more preferably 2 to 5 carbon atoms, a primary or secondary amino substituted alkyl of from 1 to 20 carbon atoms, preferably 2 to 8 carbon atoms; wherein the substituent on the amino group is an alkyl group or a hydroxy alkyl group from 1 to 6 carbon atoms, mercapto substituted alkyl of from 1 to 20 carbon atoms, preferably 2 to 8 carbon atoms; alkyl thio alkylene of up to 20 carbon atoms, preferably up to 8 carbon atoms, and a group of up to 8 carbon atoms containing an oxirane ring, most preferably 3 carbon atoms as glycidyl.

Of the above identified monomers, the most preferred are the acrylics and methacrylics.

Suitable examples of acid are acrylic acid and methacrylic acid. Suitable examples of alkyl esters are of acrylic or methacrylic acid where the alkyl group is methyl, ethyl, propyl, isopropyl, butyl, tertiary-butyl, pentyl, hexyl, ethylhexyl, octyl, decyl, dodecyl, and the like; suitable examples of hydroxy substituted alkyl is hydroxyl ethyl, hydroxy propyl, hydroxy butyl, hydroxyl pentyl, hydroxy hexyl, hydroxyl octyl, hydroxy decyl, hydroxyl dodecyl, and the like; suitable examples of aminoalkyl are amino methyl, amino ethyl, amino propyl, amino butyl, amino pentyl, amino hexyl, amino octyl, amino decyl, amino dodecyl wherein the amino group is a primary amino or a secondary amino and the substituent on the amino is an alkyl group of from 1 to 6 carbon atoms, preferably 1 to 4 carbon atoms; suitable examples of mercapto alkyl are methyl mercapto, ethyl mercapto, propyl mercapto, butyl mercapto, pentyl mercapto, hexyl mercapto, octyl mercapto, decyl mercapto, dodecyl mercapto, and the like; in like manner the alkoxy alkyl and the alkyl thio alkyl groups may be methoxy methyl, ethoxy methyl, ethoxy ethyl, methyl thiomethyl, ethyl thio ethyl and the like.

It is to be appreciated that while the polymerized resin may be a homopolymer, it is most desirable to utilize a mixture of monomers to give various properties to the ultimate coating material such as improved corrosion resistance, chip resistance, adherence, gloss, flexibility, durability, hardness, flow, and solvent resistance.

The polymer may be prepared by known polymerization techniques such as with an azo catalyst in an organic solvent in emulsion or solution polymerization.

A preferred polymerizable monomer mixture is one having a major amount of acrylic or methacrylic esters (R in the above formula is alkyl) or from about 75% to 99% by weight and a minor amount of an acid (R is hydrogen) in an amount from about 1% to about 25% by weight totaling 100% by weight.

In addition, other copolymerizable monomers, having an ethylenically unsaturated group, may be added to the mixture of monomers recited above in minor amounts of from 0.1% to about 15% by weight such as aliphatic vinyls as vinyl acetate, vinyl chloride and the like, or aromatic vinyls such as styrene, vinyl styrene, 3,5-dimethyl styrene, para-tert-butyl styrene, alpha methyl styrene and the like.

The coating material is preferably one having a basic pH, even more preferably a pH of 8 to 9 and preferably contains a water solubilizing agent, the amount of which can vary depending upon the polymeric material. Preferably, the water solubilizing agent is used in an amount ranging from about 1 part to 20 to 40 parts of resin. It is to be appreciated that any solubilizing agent may be used, such as an amine, ammonia or an alkali metal; due to the high processing temperature a high boiling material is used. Most preferably the water solubilizing agent is a nitrogen containing material such as an alcoholic amine such as diethyl ethanol amine; 2-amino-2-methyl-1propanol; diethanol amine, triethanol amine, dimethylpropanolamine, dimethylisopropanolamine, dimethylbutanolamine, N-benzylethanolamine, 2-[2-(dimethylamine)ethoxy]ethanol; 1-[2-(dimethylamine)ethoxyl]-2-propanol, and the like.

The coating material also contains an effective cross-linking amount of a batch stable nitrogenous cross-linking agent such as a urea type, melamine type, benzoguanamine, preferably a melamine type. While a variety of melamines may be employed, the most preferred are the substituted melamines such as a polyalkyl ether of a polymethylol melamine wherein each alkyl group contains from 1 to 4 carbon atoms, most preferably hexamethoxy methyl melamine.

The basis for selecting a good cross-linking agent is one that has stability in the high temperatures to which the coating material will be subjected, as well as being reasonably stable to corrosion resistant pigments that are added to the material, as well as being capable of supplying good cross-linking properties to the acrylic resin coating material.

The amount of cross-linking agent employed is comparable to the number of carboxyl groups present in the resin so that the number of functional groups in the cross-linking agent is substantially equivalent to the number of functional groups present in the acrylic resin.

In order to achieve a low cross-linking temperature, it may be desirable to add a thermosetting catalyst to the acrylic resin coating material. Preferred catalyst are Freidel-Crafts acid catalysts added in an amount about 1% to about 15% based on the nitrogenous cross-linking agent. These catalysts induce the condensation reaction between the resin and the cross-linking agent. Suitable acid catalysts that may be employed are para toluene acid, dodecyl succinic acid, n-butyl acid phosphate, phosphoric acid and the like.

It has also been found desirable to add free radical inhibitors which inhibit hydrolysis or other reaction of the resin that may cause instability. These inhibitors may be added in amounts of about 1% to about 10% by weight of the coating material (acrylic resin and the cross-linking agent combined). Suitable inhibitors are guiacol, hydroquinone and the like.

In addition the coating composition may contain various materials which impart substantially improved corrosion resistance to the ultimate coating. These materials are water soluble metallic salts of Group VI-B of the periodic table. Suitable corrosion resistant materials are chromate, dichromates, molybdates, tungstates and the like, such as strontium chromate, calcium chromate, zinc chromate, potassium chromate, sodium chromate, sodium dichromate, potassium tungstate, sodium molybdate, lead silico chromate and ammonium chromate and bichromate. In addition, complexes of molybdic and tungstic acid and the water solubilizing amines described above such as dimethyl ethanol amine may be employed.

It is also preferred that the acrylic resin be a low molecular resin, i.e., one having a molecular weight (number average) less than about 10,000 and even more preferably less than about 5,000 with an acid number of less than 150, preferably less than 100.

A preferred formulation is one comprised as follows:

| Component | Formalation A<br>Parts by Weight |
|---|---|
| Acrylic resin (70% by Wt.) of a polymer of ethyl acrylate (71.4%) Acrylic acid (12.9%) and methyl methacrylate (15.7%) in an acetone, isopropanol solvent | 1.25 |
| Hexa methoxy methyl melamine | 1 |
| Water solubilizing agent (dimethyl ethanol amine) | 1.1 |
| Strovstium chromate | 2.5 |
| Para toluene sulfonic acid (25% in water) | 0.24 |
| Water | 9.5 |

It is to be appreciated that other ingredients may be added to the coating material such as fillers, pigments, dye stuffs, coloring agents, leveling agents and the like. These ingredients or components may be added depending upon the use to which the coated product is to be employed.

The process of simultaneous sealing and impregnating the unsealed anodic coating is carried out through immersion of a freshly anodized aluminum substrate surface, in the unsealed condition, in a process vessel containing one of the above described materials. The novel water-borne resin materials herein proposed are useful in a range of concentrations from less than 1% to in excess of 70%. The bath may be maintained at 170° F. to 200° F. indefinitely with no gellation or resin precipitation or separation. Simple pH adjustments maintain excellent stability by adjusting the pH to a basic pH, preferably about 7.5 to about 9.0, even more preferably about 8.2. The time and tempeature are inversely related. The anodic coating is converted from the unsealed condition to the sealed condition through hydration of the oxide and having the structural characteristics of metal oxide monohydrate and metal oxide trihydrate in accordance with the following reactions:

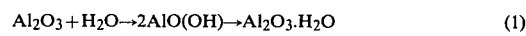

$$Al_2O_3 + H_2O \rightarrow 2AlO(OH) \rightarrow Al_2O_3.H_2O \qquad (1)$$

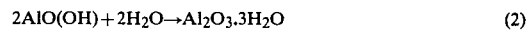

$$2AlO(OH) + 2H_2O \rightarrow Al_2O_3.3H_2O \qquad (2)$$

Following sealing/impregnation of the anodic coating, the anodized metal is rinsed in water followed by exposure in a drying oven controlled at preferably 200° F. to 500° F. for the purpose of curing. This requires on the order of 1 to 60 minutes, the time and temperature being inversely related. When the curing is of a component for the aircraft industry, temperatures greater than 300° F. are not employed normally. On occasion, it may be desirable to allow the component to dry prior to the curing operation, thereby eliminating the rinsing step after the simultaneous seal/impregnation step.

The foregoing describes a typical processing sequence which follows the conventional steps of preparing and anodizing the aluminum substrate. Such preparation for anodizing includes (a) degreasing, (b) alkaline cleaning, and (c) deoxidizing with intermediate water rinsing after each of the operations (a), (b) and (c). Anodizing may be accomplished using the electrolytes and process control parameters necessary to develop anodic coatings of, although not limited to, the chromic, sulfuric, and modified sulfuric acid types followed by immediate water rinse. For a discussion of cleaning and finishing aluminum and aluminum alloys, see *Metals Handbook*, 8th Ed. (1964), Vol. 2, published by American Society for Metals, pp. 611-634, which is hereby incorporated by reference.

Specific examples of applying a corrosion inhibitive coating to aluminum and aluminum alloy components, specifically 7075-T6 in accordance with the present invention are set forth as follows:

EXAMPLE 1

1. The component was vapor degreased using a trichloroethylene of 1-1-1 trichloroethane material and then left in the degreaser until dry.

2. The degreased component was cleaned for approximately 18 minutes in an inhibited alkaline cleaner of PH 11.8 to 13, active alkalinity of 20% to 25% by weight, concentration of approximately 5 oz. per gallon and maintained at about 170° F.

3. The component was then rinsed in ambient water (approximately 70° F.) for about 90 seconds.

4. The component was deoxidized for approximately 8 minutes in an aluminum deoxidizer compounded from 17 to 23 oz/gal (wt.) 66° Bé sulfuric acid, 3 to 5 oz/gal (wt.) sodium dichromate, and 0.6 to 0.8 oz/gal (wt.) ammonium bifluoride maintained at room temperature (approximately 70° F.).

5. The component was then rinsed in ambient water for approximately 2 minutes.

6. The component was then anodized for approximately 30 minutes in 15% 66° Bé sulfuric acid to 6 to 24 Volts (DC), 12 to 15 amps/ft.$^2$ and maintained at approximately 70° F.

7. The anodized component was rinsed in ambient water for approximately 2 minutes.

8. The component was then immersed for about one hour in the water borne organic resin coating material, "Formulation A", diluted two parts water to 1 part "Formulation A", and maintained at 175°±5° F.

9. Following this bath whereby the component was concurrently sealed and primed, it was air dried at ambient temperatures for 60±5 minutes.

10. Finally, the component was cured in a dry air oven for 15 minutes at 295°±5° F.

EXAMPLE 2

The component to be coated was prepared following the same steps 1 through 7 as in Example 1.

8. The component was then sealed and primed by a bath for approximately 30 minutes in the resin-contained water borne composition described above in Example 1 and maintained at 200° F.±5° F.

9. Following this bath the component was air dried and cured as in steps 9 and 10 of Example 1; however curing was effected for about 30 minutes at 255° F.±5° F. in this case.

EXAMPLE 3

This time the component to be coated was prepared following the same steps 1 through 5 of Example 1.

6. The component was then anodized for approximately 48 minutes in 4 to 7 oz/gal (wt.) chromic acid operated at about 48 volts (DC), one amp/ft.$^2$ (minimum) and maintained at approximately 100° F.

The component was then treated following the same steps 7 through 10 of Example 1.

EXAMPLE 4

This time the component to be coated was prepared following the same steps 1 through 6 of Example 3.

Following a rinse in ambient water for about 2 minutes, the component was then treated following the same steps 8 through 10 of Example 2.

Environmental salt spray tests were conducted with Example 2 specimen in 5% salt fog operated at 95° F. within a pH range of 6.5 to 7.2. After 9,000 hours of exposure of these specimens no signs of corrosion attack resulted. Comparable results were obtained in other examples tested.

From all of these tests it was concluded that maximum protection against corrosion attack is achieved through sealing at higher temperatures of the specified range.

The coated aluminum component in each of the above cases demonstrated that superior corrosion protection can be imparted to aluminum and aluminum alloys through the above described process than heretofore obtained from the separate processes of sealing and organic priming. This was determined by comparative tests between components conventionally anodized, sealed and zinc chromate and epoxy primed in successive steps and those treated as herein described both subjected to the same corrosion environment for equal, prolonged periods. Upon inspection of test components after 3900 hours of exposure in 5% salt spray, all of the prior art components demonstrated corrosion failures whereas none of the components treated as herein described exhibited any signs of corrosion.

Further, the cost of performing the anodic coating sealing and priming operations simultaneously was found to be considerably less than performing separate operations of sealing and priming. This is due principally to the absence of manual labor input required during the primer application operation. The process of the present invention is useful for aluminum and aluminum alloys wherein the alloys are comprised of aluminum and other elements of the Periodic Chart, see *Metals Handbook*, 8th Ed. (1961) published by American Society for Metals, page 917 which is hereby incorporated by reference.

What is claimed is:

1. A protective coating process for aluminum and aluminum alloy components comprising the steps of:
   anodizing the component to be coated;
   applying a coating composition comprising a water soluble acrylic polymer or copolymer and a nitrogenous cross-linking agent to the anodized component at a temperature in the range of approximately 170° F. to 200° F. for a period ranging from about 30 to 60 minutes, the time and temperature being inversely related whereby said composition seals the anodized component through hydration and simultaneously primes the anodized component providing a surface coating capable of being cross-linked during a subsequent curing operation; and
   curing the sealed and primed component at a temperature in the range of approximately 200° F. to 500° F. for approximately 1 to 60 minutes, the time and temperature being inversely related.

2. The process of claim 1 wherein said application of the coating composition is accomplished by immersion of said component in the composition for about one hour and maintaining the temperature at about 175° F.

3. The process of claim 1 wherein said application of the coating composition is accomplished by immersion of said component in the composition for about 30 minutes and maintaining the temperature at about 180° F.

4. The process of claim 3 wherein the cross-linking agent is hexamethoxy methyl melamine.

5. The process of claim 1 wherein the cross-linking agent is a polyalkyl ether of a polymethylol melamine wherein each alkyl group contains from 1 to 4 carbon atoms.

6. The process of claim 1 wherein said curing is effected by adding to said coating composition a Friedel-Crafts catalyst in an amount sufficient to promote thorough curing when exposed to temperatures of 200° F. to 500° F. for approximately 1 to 60 minutes, the time and temperature being inversely related, followed by curing under the aforesaid conditions.

7. The process of claim 1 wherein the coating composition includes a corrosion inhibitor containing water soluble metallic salts of chromium, molybdenum and tungsten.

* * * * *